March 25, 1969  T. J. O'CONNOR  3,435,178
QUICK-CHANGE TOOL FOR ELECTRICAL MACHINING OF DEEP HOLES
Filed Jan. 8, 1968

INVENTOR
THOMAS J. O'CONNOR
BY Whittemore,
Hulbert & Belknap
ATTORNEYS

United States Patent Office 3,435,178
Patented Mar. 25, 1969

3,435,178
QUICK-CHANGE TOOL FOR ELECTRICAL
MACHINING OF DEEP HOLES
Thomas J. O'Connor, 100 Morgan Road,
Ann Arbor, Mich. 48104
Continuation-in-part of application Ser. No. 504,971,
Oct. 24, 1965, which is a continuation-in-part of
application Ser. No. 250,321, Jan. 9, 1963. This
application Jan. 8, 1968, Ser. No. 696,160
Int. Cl. B23k 9/16
U.S. Cl. 219—69
8 Claims

ABSTRACT OF THE DISCLOSURE

A tool for use with electrical machining apparatus to permit electrical machining of holes deeper than the ram travel of electrical machining apparatus to which the tool is secured, along with means for rotating the machining electrode to provide uniform electrode wear. A dovetail, tool base plate, portion is provided for rapidly and accurately securing the tool to electrical machining apparatus. In one embodiment a long, rotatably mounted tube is provided to receive a long electrode and means is provided for rotating the tube while feeding fluid therethrough to the electrode. In a second embodiment, the tool includes a stationary tube for receiving one end of an electrode inserted therein, a sleeve extends over and is secured to the other end of the electrode, and means are provided for rotating the sleeve secured to the electrode to provide rotation of the electrode about the longitudinal axis thereof.

Cross-reference to related applications

This application is a continuation-in-part of application Ser. No. 504,971, filed Oct. 24, 1965, now Patent No. 3,363,083, which is a continuation-in-part of application Ser. No. 250,321, filed Jan. 9, 1963, now Patent No. 3,222,494.

Background of the invention

*Field of the invention.*—The invention relates to electrical machining and refers more specifically to a quick-change tool for electrical machining in conjunction with electrical machining apparatus, including means for rapidly and accurately securing the tool to the electrical machining apparatus, means for adjustably receiving an electrode substantially longer than the stroke of the ram of the electrical machining apparatus to which the tool is attached, whereby holes deeper than the stroke of the ram of the electrical machining apparatus may be machined and means for rotating the electrode secured to the tool.

*Description of the prior art.*—In the past it has generally been considered necessary to use electrical machining apparatus having a stroke at least equal in length to the depth of a hole to be electrically cut in a conducting workpiece. Thus, in the past an electrode has been secured to the ram over the workpiece in which an opening is to be machined and the ram advanced toward the workpiece to maintain a constant spark gap while electrical machining progresses. With such structure and machining method it is impossible to machine a hole in a workpiece deeper than the stroke of the ram of the electrical machining apparatus to which the electrode is secured.

Summary of the invention

In accordance with the invention there is provided a quick-change tool which is simple, economical and efficient in permitting the electrical machining of holes deeper than the ram stroke of the electrical machining apparatus to which the tool is secured.

In accordance with the invention the tool is constructed to receive an electrode longer than the hole to be machined is deep for progressive feeding into the hole after cuts equal to the length of the ram stroke of the electrical machining apparatus to which the electrode is secured. The electrode is of course offset from the ram.

Additionally there is provided in accordance with the invention structure for rotating the electrode while machining therewith and permitting feeding of the electrode into the hole after withdrawal of the electrode from the hole at the end of each ram stroke.

Description of the preferred embodiments

Figure 1:
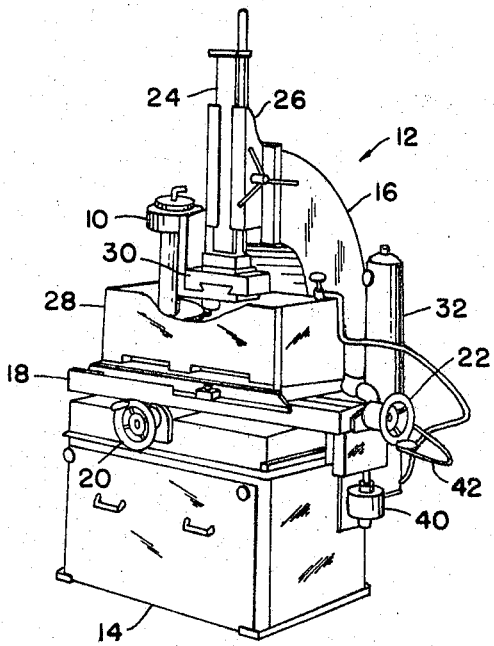
FIGURE 1 is a perspective view of a mechanical section of electrical discharge machining apparatus having a quick-change tool for electrical machining of deep holes constructed in accordance with the invention secured thereto.
Figure 2:
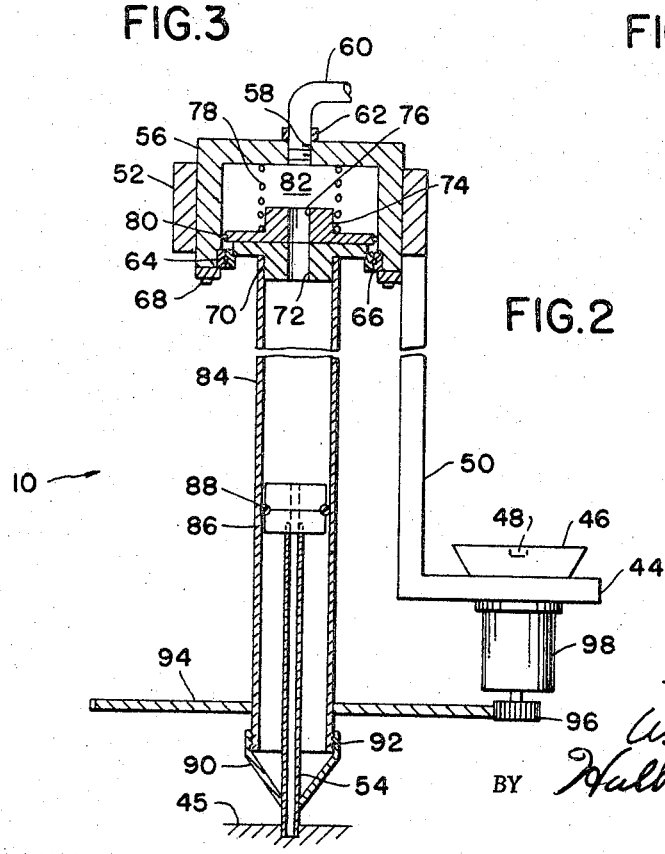
FIGURE 2 is an enlarged, broken, longitudinal section view of the tool for electrical machining of deep holes illustrated in FIGURE 1.

The quick-change tool 10 for electrical machining of deep holes illustrated best in FIGURE 2 is shown mounted on a mechanical section 12 of electrical discharge machining apparatus in FIGURE 1.

The mechanical section 12 includes the base 14, frame 16, and table 18 positioned on base 14. The dielectric tank 28 is carried on table 18 for movement along perpendicular horizontal axes on rotation of the cranks 20 and 22 which are connected between the base 14 and the table 18 and between the table 18 and tank 28 by means of ball nut and screw mechanisms. A ram 24 is supported in guides 26 for vertical reciprocal movement into and out of the dielectric tank 28 in response to the usual servo drive mechanism of electrical discharge machining mechanical sections (not shown). The dovetail platen 30 is secured to the ram 24 for movement therewith and functions to facilitate the rapid accurate securing of the quick-change tool 10 to the electrical discharge machining apparatus mechanical section 12. Filter means 32, pump 40 and associated connections 42 for supplying dielectric fluid to the tank 28 and draining fluid therefrom as required for electrical discharge machining are included in the mechanical section 12.

As will be understood by those in the art and as more fully explained in the cross-referenced applications and patent and the references cited therein, the electrical discharge machining apparatus is completed by a power supply for producing pulsed direct current for application between a workpiece 45 positioned in the dielectric tank 28 and an electrode held by the tool 10 supported in the insulated platen 30 and the usual servo drive circuit connecting a servo drive motor for the ram 24 in parallel with the spark gap between the electrode carried by the tool 10 and a workpiece operable to maintain a predetermined spark gap therebetween. Since such power supplies and servomotor circuits are well known, they will not be considered in detail herein.

The quick-change tool 10, as shown best in FIGURE 2, includes a base plate 44 having a dovetail portion 46 with a locating recess 48 therein extending from one side thereof. The dovetail portion 46 and locating recess 48 facilitate the rapid accurate securing of the quick-change tool 10 to the electrical discharge machining apparatus mechanical section 12. Supporting frame 50 including an annular portion 52 extends upwardly from the base plate 44, as shown in FIGURE 2.

Structure for receiving the long electrical discharge machining electrode 54 is held in the annular portion 52 of the supporting frame 50 and includes the cylindrical member 56 having an open lower end and a substantially closed upper end with opening 58 extending therethrough. A dielectric hose 60 is secured to the cylindrical member 56 at the opening 58 over the closed upper end thereof by convenient means, such as a threaded fitting 62, as illustrated.

Bearings 64 are positioned in the lower end of the cylindrical member 56 in the enlarged diameter portion 66 thereof and are held in position by the annular ring 68 which may be bolted to the bottom of the cylindrical member 56. An inverted hat-shaped member 70 is secured in the inner race of the bearings 64 and, as shown, has an axial opening 72 extending therethrough.

A second hat-shaped member 74 having an axial opening 76 extending therethrough aligned with the axial opening 72 in the hat-shaped member 70 is provided within the cylindrical member 56 in surface-to-surface engagement with the hat-shaped member 70, as shown in FIGURE 2. Spring 78 urges the hat-shaped member 74 into contact with the hat-shaped member 70. Seal 80 is provided to seal the dielectric in the chamber 82 except for the aligned openings 72 and 76.

An elongated tubular member 84 is secured at the top thereof to the hat-shaped member 72 by convenient means, such as bolts (not shown) and is operable to receive the shank 86 of the electrical discharge machining electrode 54 having annular seal 88 therearound for sliding movement therein. Collet structure 90 is secured to the bottom of the tubular member 84 by convenient means, such as the threaded connection 92 shown therebetween. The electrical discharge machining apparatus electrode 54 may thus be secured in any vertically adjusted position within the tubular member 84.

The means for rotating the electrode 54 during machining therewith includes the gear 94 secured to the tube 84 for rotation therewith, the pinion 96 in mesh with the gear 94 and the servo drive motor 98 connected to the base plate 14 on the side thereof opposite the dovetail portion 46, as illustrated.

Thus, in overall operation, when it is desired to electrically machine a hole in a workpiece deeper than the stroke of the ram 24, the quick-change tool 10 is secured to the dovetail platen 30 by means of the dovetail portion 46 of the base plate 44 with the long electrical discharge machining electrode 54 positioned in the tube 84 as far as possible and with the electrode 54 directly over a workpiece in the dielectric tank 28. Electrical discharge machining is then carried out in the usual manner through the stroke of the ram 24 with dielectric passing through the hose 60, chamber 12, aligned openings 72 and 76 and the hollow electrode 54. The electrode 54 is rotated at this time by energizing the motor 98 through pinion 96 and gear 94 connected to rotate the tube 84.

After the completion of the stroke of the ram 24 under the usual servo drive, the ram may be backed up to its full height and the electrode 54 withdrawn from the tube 84 a distance equal to the stroke of the ram and the electrical discharge machining continued throughout the length of an additional ram stroke, after which the process of extending the electrode 54 may be repeated. Thus, an opening may be machined with the quick-change tool 10, the depth of which is limited only by the length of electrode 54 available and the height of the tube 84.

It will be noted that the workpiece need not be positioned in the tank 28, but for exceptionally deep holes, the workpiece may be positioned in a tank at the side of the electrical machining apparatus mechanical section 12 with the tool 10 extended sideways by extending the base plate 44 as desired. Further, it will be apparent that the pressure of the dielectric in the tube 84 above the electrode 54 will in most cases, if desired, be sufficient to feed the electrode 54 toward the workpiece automatically as the electrical cutting progresses.

Figure 3:
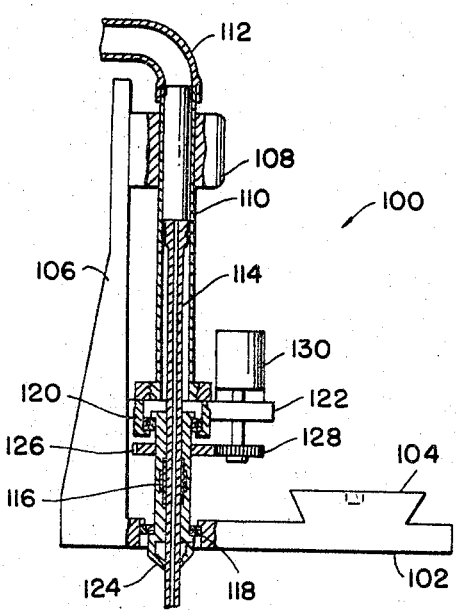
FIGURE 3 is a partly broken away elevation view of a second embodiment of the tool for permitting electrical machining of deep holes constructed in accordance with the invention.

The embodiment 100 of the quick-change tool of the invention illustrated in FIGURE 3 is similar to the embodiment 10 and again includes the base plate 102 having the dovetail portion 104 extending from one side thereof and having the frame 106 including the annular part 108 surrounding the elongated stationary tube 110 extending upward from one edge thereof. The tube 110 is connected at the top thereof to the dielectric hose 112 and is adapted to receive the long electrical discharge machining electrode 114 in the other end thereof.

A sleeve 116 is positioned around the lower portion of the electrode 114 and is mounted for rotation in bearings 118 and 120 in the base plate 102 and frame 122, respectively, as shown in FIGURE 3. The sleeve 116 is releasably connected to the electrode 114 by collet 124 and is adapted to be rotated by the gear 126 secured thereto on rotation of the pinion 128 in mesh with the gear 126 when the motor 130 is energized.

The overall operation of the quick-change tool 100 is in all respects similar to the operation of the quick-change tool 10 considered above and will not therefore be considered separately.

While two embodiments of the present invention have been considered in detail, it will be understood that other embodiments and modifications thereof are contemplated. It is the intention to include all embodiments and modifications as are defined by the appended claims within the scope of the invention.

I claim:
1. A tool for electrical machining in conjunction with electrical machining apparatus including a ram comprising an elongated tube, means for supporting the tube on the ram, an elongated electrode having a length greater than the optimum stroke of the electrical machining apparatus ram, one end of which is positioned within the elongated tube, means for guiding the electrode at the other end of the tube and means for providing fluid pressure through the tube on the one end of the electrode for progressively feeding the electrode from the tube in response to the pressure of the fluid to permit electrical machining of a hole substantially deeper than the stroke of the ram of the electrical machining apparatus.

2. Structure as set forth in claim 1 wherein the means for supporting the tube on the ram includes a dovetail tool portion.

3. Structure as set forth in claim 1 and further including means for rotating the electrode during a machining operation.

4. Structure as set forth in claim 3 wherein the means for rotating the electrode comprises a first gear secured to the tube, a second gear engaged with the first gear and motor means for rotating the second gear.

5. Structure as set forth in claim 3 wherein the means for guiding the electrode at the other end thereof comprises a sleeve surrounding the other end of the electrode, and further including means securing the other end of the electrode to the sleeve for rotation therewith and wherein the means for rotating the electrode includes a first gear secured to the sleeve for rotation with the sleeve, a second gear in mesh with the first gear and motor means for rotating the second gear.

6. A quick-change tool for electrical machining in conjunction with electrical machining apparatus comprising a base plate, means for securing a long electrode to the tool constructed and arranged for progressive feeding of the electrode from the tool to permit electrical machining of a hole substantially deeper than the stroke of the ram of electrical machining apparatus to which the tool is secured, including a frame secured to the base plate, an elongated tube adapted to receive one end of the electrode and means for securing the electrode to the elongated tube, means for rotatably mounting the elongated tube at the other end thereof including means for rotatably securing the tube to the frame comprising a cylindrical member secured to the frame having an open bottom and a closed top with an opening therein, a first inverted hat-shaped member having an opening through the center thereof rotatably mounted adjacent the bottom of the cylindrical member to which the upper end of the tube is connected and a second hat-shaped member positioned over the first hat-shaped member in engagement therewith within the cylindrical member and means urging the second hat-shaped member into contact with the first hat-shaped member.

7. Structure as set forth in claim 6 and further including means for passing a fluid into the elongated tube and through the hollow electrode positioned therein.

8. Structure as set forth in claim 7 and further including means for rapidly and accurately securing the tool to electrical machining apparatus including a dovetail portion extending from one side of the base plate.

References Cited
UNITED STATES PATENTS

| | | |
|---|---|---|
| 1,195,145 | 8/1916 | Mattingly. |
| 2,539,439 | 1/1951 | Kumler. |
| 3,125,700 | 3/1964 | Bentley et al. |

RICHARD M. WOOD, *Primary Examiner.*

R. F. STAUBLY, *Assistant Examiner.*